(12) United States Patent
Jiang et al.

(10) Patent No.: US 7,824,649 B2
(45) Date of Patent: Nov. 2, 2010

(54) APPARATUS AND METHOD FOR SYNTHESIZING A SINGLE-WALL CARBON NANOTUBE ARRAY

(75) Inventors: Kai-Li Jiang, Beijing (CN); Zhuo Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 642 days.

(21) Appl. No.: 11/414,040

(22) Filed: Apr. 28, 2006

(65) Prior Publication Data

US 2007/0048211 A1    Mar. 1, 2007

(30) Foreign Application Priority Data

Aug. 19, 2005   (CN) .................... 2005 1 0036746

(51) Int. Cl.
*D01F 9/12*     (2006.01)
*D01C 5/00*     (2006.01)
*C23C 16/00*    (2006.01)

(52) U.S. Cl. .............. 423/447.3; 423/447.2; 423/447.8; 427/249.1; 977/742; 977/833

(58) Field of Classification Search .............. 423/447.8, 423/447.2, 447.3; 422/186; 427/249.1; 977/742, 977/833; B01J 19/08; B05D 3/04; C23C 16/00; D01F 9/12

See application file for complete search history.

(56) References Cited

U.S. PATENT DOCUMENTS 3,958,956 A * 5/1976 Goeke ........................ 48/62 R
6,692,324 B2 * 2/2004 Simpson et al. ............... 445/24
2002/0102193 A1   8/2002 Smalley et al.
2002/0127170 A1 * 9/2002 Hong et al. .............. 423/447.3
2002/0150524 A1 * 10/2002 Smalley et al. ............. 422/198
2002/0172767 A1 * 11/2002 Grigorian et al. ....... 427/255.28
2005/0079119 A1 * 4/2005 Kawakami et al. ....... 423/447.3
2005/0260120 A1 * 11/2005 Smalley et al. ........... 423/447.1
2009/0093360 A1 * 4/2009 Ma et al. .................... 502/182

FOREIGN PATENT DOCUMENTS

CN    1176014 C    11/2004

OTHER PUBLICATIONS

Xie et al. "Large scale synthesis of aligned carbon nanotubes." Science. vol. 274. Dec. 1996.*
Dai et al., Chemical Vapor Deposition of Methane for Single-walled Carbon Nanotubes, Chem. Phys. Lett., 1998, 567-574, vol. 292.

* cited by examiner

*Primary Examiner*—Kiley Stoner
*Assistant Examiner*—Alexander Polyansky
(74) *Attorney, Agent, or Firm*—Jeffrey T. Knapp

(57) ABSTRACT

This apparatus and method facilitate the synthesis of a single-wall carbon nanotube array. The apparatus includes a reactor, a local heating device, a gaseous carbon supplier, and a reactant gas supplier. The reactor is configured for receiving a catalyst in a reaction zone thereof. The local heating device is configured for selectively heating the reaction zone and/or the catalyst received thereat. The gaseous carbon supplier is configured for introducing gaseous carbon into the reactor from an upstream position of the reaction zone. The reactant gas supplier is configured for introducing a reactant gas containing a carbon source gas into the reactor. A densely aligned, single-wall carbon nanotube array can be achieved due to the proximity to the catalyst of the heating device and due to the gaseous carbon supplier.

15 Claims, 2 Drawing Sheets

APPARATUS AND METHOD FOR SYNTHESIZING A SINGLE-WALL CARBON NANOTUBE ARRAY

TECHNICAL FIELD

This invention relates to an apparatus and method for synthesizing a carbon nanotube array and, more particularly, to an apparatus and method for synthesizing an array of single-wall carbon nanotubes.

BACKGROUND

Carbon nanotubes are very small tube-shaped structures having the composition of a graphite sheet, formed as a tube. Carbon nanotubes produced by arc discharge between graphite rods were first discovered and reported in an article by Sumio Iijima entitled "Helical Microtubules of Graphitic Carbon" (Nature, Vol. 354, Nov. 7, 1991, pp. 56-58).

Carbon nanotubes are electrically conductive along their length, are chemically stable, and can have very small diameters (much less than 100 nanometers) and large aspect ratios (length/diameter). Due to these and other properties, it has been suggested that carbon nanotubes can play an important role in fields such as microscopic electronics, field emission devices, and thermal interface materials, etc.

Generally, carbon nanotubes are divided into multi-wall carbon nanotubes (hereinafter referred to as MWNTs) and single-wall carbon nanotubes (hereinafter referred to as SWNTs). The SWNT is a single graphite sheet formed as a hollow cylinder, and the minimum diameter of such a SWNT is less than 1 nanometer. The MWNT has two or more graphite sheets together shaped as a hollow cylinder. The SWNTs are believed to be much more free of defects than MWNTs, as the MWNTs can admit defects in the form of bridges between the unsaturated carbon atoms of the neighboring walls, whereas the SWNTs have no neighboring walls, which precludes the formation of inter-wall defects therein. So, the SWNTs tend to have more excellent physical and chemical properties than that of the MWNTs. Accordingly, the SWNTS are generally thought to have more extensive applications than the MWNTs, especially in areas such as field emission devices and thermal interface materials.

However, it is difficult to synthesize a mass of substantially aligned single-wall carbon nanotubes, i.e., a single-wall carbon nanotubes array, due to the inherent small diameters of the SWNTs. Due to the small diameters thereof, the growth directions thereof are difficult to control, and the low nucleation rate of single-wall carbon nanotubes tends to result in a low density (i.e., number of nanotubes per a given area).

What is needed, therefore, is to provide an apparatus and method for effectively synthesizing a single-wall carbon nanotube array.

SUMMARY

A preferred embodiment provides an apparatus for synthesizing a single-wall carbon nanotube array includes a reactor, a local heating device, a gaseous carbon supplier, and a reactant gas supplier. The reactor is configured for receiving a catalyst at the reaction zone thereof. The local heating device is configured for selectively heating at least one of the reaction zone and the catalyst received thereat, up to a predetermined temperature (preferably only heating the catalyst layer, so as to achieve an apparent temperature gradient at the catalyst location). The gaseous carbon supplier is configured for introducing gaseous carbon into the reactor from a position upstream of and proximate the catalyst. The reactant gas supplier is configured for introducing a reactant gas into the reactor. The reactant gas contains a carbon source gas.

In another preferred embodiment, a method for synthesizing a single-wall carbon nanotube array includes the following steps of receiving a catalyst into a reactor at a reaction zone thereof; selectively heating at least one of the reaction zone and the catalyst, up to a predetermined temperature; introducing gaseous carbon into the reactor from a position upstream of and proximate the catalyst; and introducing a reactant gas containing a carbon source gas into the reactor; and forming a plurality of substantially densely aligned single-wall carbon nanotubes formed on the catalyst using the carbon source gas and the gaseous carbon.

Compared with the conventional apparatuses and methods, an apparatus and method in accordance with a preferred embodiment can obtain a single-wall carbon nanotube array having a plurality of substantially densely aligned single-wall carbon nanotubes formed on the catalyst, due to the proximity to the catalyst of the heating device and gaseous carbon supplier.

Other advantages and novel features will become more apparent from the following detailed description of embodiments when taken in conjunction with the accompanying drawings.

BRIEF DESCRIPTION OF THE DRAWINGS

Many aspects of the present apparatus and method for synthesizing a single-wall carbon nanotube array can be better understood with reference to the following drawings. The components in the drawings are not necessarily to scale, the emphasis instead being placed upon clearly illustrating the principles of the present apparatus and method. Moreover, in the drawings, like reference numerals designate corresponding pails throughout the several views.

The exemplifications set out herein illustrate at least one preferred embodiment, in one form, and such exemplifications are not to be construed as limiting the scope of the present apparatus and method for synthesizing a single-wall carbon nanotube array in any manner.

DETAILED DESCRIPTION OF THE EMBODIMENTS

Figure 1:
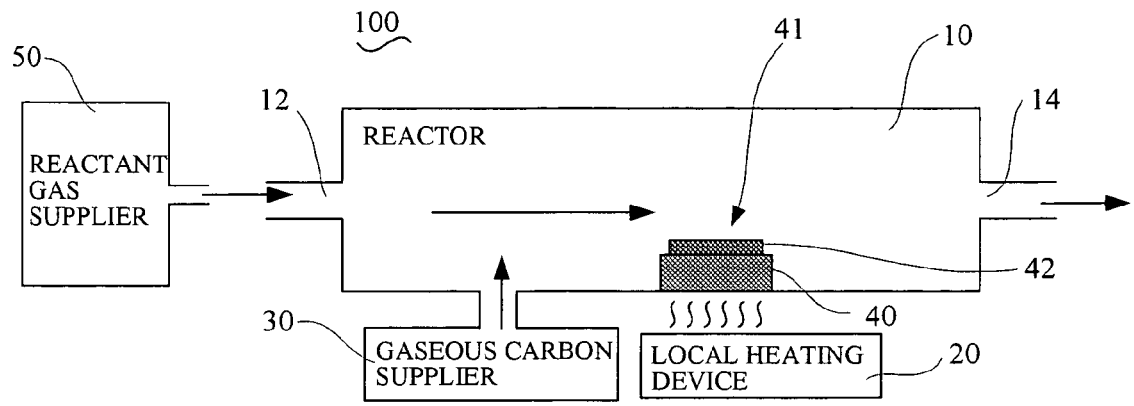
FIG. 1 is a schematic view of an apparatus for synthesizing a single-wall carbon nanotube array in accordance with a preferred embodiment.

Referring to FIG. 1, a nanotube-growth apparatus 100 for synthesizing a single-wall carbon nanotube array is shown. The apparatus 100 includes a reactor 10, a local heating device 20, a gaseous carbon supplier 30, and a reactant gas supplier 50.

The reactor 10 is configured for receiving, at a reaction zone 41, a catalyst 42 used for synthesizing a single-wall carbon nanotube array. The reactor 10 may be a CVD (chemical vapor deposition) reactor and usually is a tube furnace made from quartz or another ceramic. The reactor 10 includes a gas inlet 12 and a gas outlet 14, opposite to the gas inlet 12, for discharging an exhaust gas. Typically, the gas inlet 12 and the gas outlet 14 are positioned at two opposite ends of the tube furnace. It is understood that the reactor 10 may be any other suitable apparatus well known in the art.

The local heating device 20 is positioned proximate the catalyst 42 and is configured for selectively, locally heating the reaction zone 41 and/or the catalyst 42 to a predetermined temperature, particularly a synthesis temperature of single-wall carbon nanotubes (preferably only heating the catalyst layer, so as to achieve an apparent temperature gradient at the catalyst location). The synthesis temperature usually is in the range from 650 to 1200° C. (degree Celsius). The local heating device 20 advantageously can be used for heating electrical conductive materials, such as transition metals and alloys thereof. For example, the local heating device 20 may be a microwave heating device, which includes a microwave generator for generating microwaves and a microwave guide for guiding the microwaves to the reaction zone 41. The local heating device 20 may instead be a radio-frequency heating device, which includes a radio-frequency generator disposed near the reaction zone 41 for generating radio-frequency energy. Yet as a further alternative, the local heating device 20 may be an electromagnetic inductive heating device, which would include a high-frequency coil around the reaction zone 41 and a high-frequency power supply for applying a high-frequency current to the high-frequency coil.

The gaseous carbon supplier 30 is configured for introducing gaseous carbon into the reactor 10 from an upstream position of the catalyst 42 (as shown in FIG. 1). Generally, the upstream position of the catalyst 42 is a position located at a lateral side of the catalyst 42 near the gas inlet 12 (i.e., a position between the gas inlet 12 and the catalyst 42). The gaseous carbon supplier 30 usually is hermetically connected with the reactor 10.

The gaseous carbon supplier 30 can include a graphite block (i.e., a block/source of graphite material) and a power supply for applying a heating current to the graphite block material. The heating current is able to implement a vaporization process so as to evaporate an amount of carbon. The gaseous carbon can be introduced/carried into the reactor 10 via an inert gas (a source of which could be incorporated with the gaseous carbon supplier 30). Alternatively, the gaseous carbon supplier 30 may include a graphite block material and a laser apparatus for generating a laser beam impinging thereon to implement a laser ablation process so as to evaporate carbon. It is understood that the gaseous carbon supplier can have yet another suitable configuration, such as an arc discharge apparatus and a plurality (e.g., a couple) of graphite electrodes installed therein to perform an arc discharge process so as to produce gaseous carbon.

The reactant gas supplier 50 is configured for introducing a reactant gas containing a carbon source gas into the reactor 10 for synthesizing a single-wall carbon nanotube array. The carbon source gas is usually a hydrocarbon gas, such as methane, ethylene, acetylene, etc.; or a mixture of hydrocarbon gases. The reactant gas supplier 50 also can provide hydrogen gas and/or an inert gas, which can be supplied together with the carbon source gas. The reactant gas supplier 50 generally includes a valve for controlling a flow rate of the reactant gas.

Figure 2:
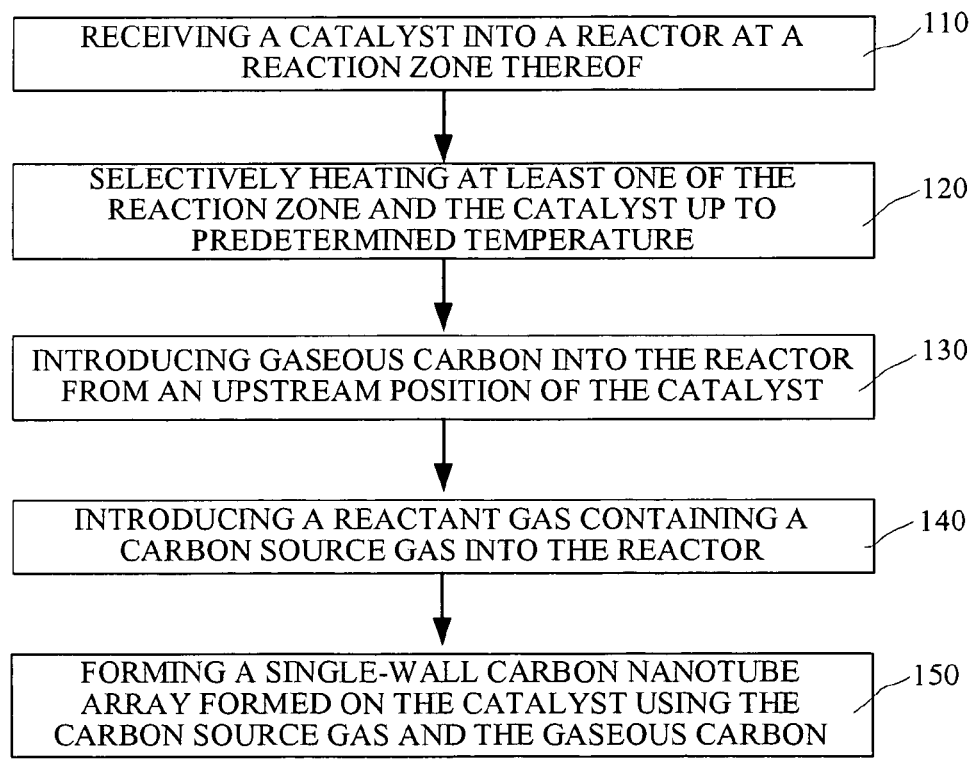
FIG. 2 is a schematic flow chart illustrating a method for synthesizing a single-wall carbon nanotube array, using the apparatus shown in FIG. 1.

A method for synthesizing a single-wall carbon nanotube array using such an apparatus 100 will be described in detail with reference to FIG. 2 and FIG. 1. The method includes the following steps:

step 110: receiving a catalyst into a reactor at a reaction zone thereof;

step 120: selectively heating at least one of the reaction zone and the catalyst up to predetermined temperature (preferably the catalyst);

step 130: introducing gaseous carbon into the reactor from an upstream position of the catalyst;

step 140: introducing a reactant gas containing a carbon source gas into the reactor; and step 150: forming a single-wall carbon nanotube array formed on the catalyst using the carbon source gas and the gaseous carbon.

In step 110, catalyst 42 is received into the reactor 10 (see FIG. 1). The catalyst 42 is usually formed by a deposition process, on a surface of a substrate 40. Preferably, the substrate 40 is formed of a material such as silicon, glass, quartz, silicon oxide ($SiO_2$), or aluminum oxide ($Al_2O_3$), which is not heated up by the local heating device 20, such a device advantageously being chosen to selectively heat metallic materials but not so nonmetals. Typically, the catalyst 42 is a catalyst thin film, which has a nano-sized (less than 1 micron) thickness. Preferably, the catalyst thin film has a thickness about in the range from 1 to 20 nanometers. The catalyst 42 can be formed of a transition metal material such as iron (Fe), cobalt (Co), nickel (Ni), or an alloy thereof.

In step 120, the catalyst 42 is selectively heated up to a predetermined temperature, particularly a synthesis temperature of single-wall carbon nanotubes. Generally, the synthesis temperature of single-wall carbon nanotubes in this embodiment is in the range from 650 to 1200° C. Such heating is implemented by the local heating device 20 and can be selectively restricted to the catalyst 42 such that a reactant gas and the substrate 40 provided into the reactor 10 are not heated until reaching the catalyst 42. This selectively heating will result in an apparent temperature gradient at the catalyst location, thereby helping achieve a high nucleation rate of single-wall carbon nanotubes.

In the heating process, the catalyst 42, in the form of catalyst thin film, can be converted/patterned into a plurality of densely packed nano-sized catalyst particles with narrow size distribution, which can give rise to densely packed single-walled carbon nanotubes having a narrow distribution in diameter. Generally, hydrogen gas and/or an inert gas, termed a "carrier gas", is introduced into the reactor 10 through the gas inlet 12 to discharge oxygen gases existing therein before the heating process. Furthermore, the carrier gas can be provided by the reactant gas supplier 50 and is advantageously continuously introduced therein to purge unwanted gases and to help carry the carbon and carbon source gases.

In step 130, gaseous carbon (as indicated by the arrow shown in FIG. 1) is introduced into the reactor 10 from the upstream position of the catalyst 42. The gaseous carbon can be in the form of a plurality of single carbon atoms and/or clusters of plural carbon atoms. The gaseous carbon can be produced by means of the vaporization process, the laser ablation process, and/or the arc discharge process. The amounts of the gaseous carbon can accordingly be adjusted by adjusting a value of the heating current in the vaporization process, an output power of the laser apparatus in the laser ablation process, and/or a value of the discharge current in the arc discharge process. The gaseous carbon introduced into the reactor 10 can provide an abundant supply of carbon atoms to meet the requirement of a fast growth velocity of single-wall carbon nanotubes.

In step 140, a reactant gas containing a carbon source gas (as indicated by the arrows in the FIG. 1) is introduced into the reactor 10 through the gas inlet 12. The carbon source gas can be hydrocarbon gas such as methane, ethylene, acetylene, etc; or a mixture of hydrocarbon gases. Generally, the carbon source gas is introduced into the reactor 10 together with a carrier gas via the reactant gas supplier 50. Typically, an internal pressure of the reactor 10 is in the range from about 400~600 Torr during the synthesis process of the single-wall carbon nanotube array; and a ratio of the flow rate of the carbon source gas to the carrier gas is in the range from 1:1~1:10. Thereby, a flow rate of the carbon source gas can be in the range from 20 to 60 sccm (standard cubic centimeter per minute), and a flow rate of the carrier gas can be in the range from 200 to 500 sccm. In the illustrated embodiment, the internal pressure is retained about at 500 Torr in the synthesis process of the single-wall carbon nanotube array. Accordingly, the flow rate of the carrier gas is about 360 sccm, and the flow rate of the carbon source gas is about 40 sccm, such that the total flow rate of the reactant gas is about 400 sccm.

As per step 150, a plurality of substantially densely aligned single-wall carbon nanotubes, i.e., a single-wall carbon nanotube array, is formed on the catalyst 42. The formation of such an array is actually the product of a series of substeps. The carbon source gas introduced into the reactor 10 reaches the catalyst 42 together with the gaseous carbon. The carbon source gas is decomposed into carbon atoms and hydrogen gas in a catalytic reaction process with the catalyst 42. The hydrogen gas can facilitate the growth of the single-wall carbon nanotubes of the array along a direction vertical to the outer surface of the substrate 40. Both sources of carbon atoms (that from the decomposed carbon source gas and from the gaseous carbon supplier 30) will dissolve in the nano-sized catalyst particles of the catalyst 42, whereby metal carbides are formed and an amount of heat is generated due to the exothermic reactions. In order to efficiently dissipate the heat from the catalyst 42, a plurality of substantially densely aligned single-wall carbon nanotubes rapidly grow, due to their excellent thermal conductivities, from the catalyst 42, such nanotubes being supported by the substrate 40. An average growth velocity of the single-wall carbon nanotubes can be up to about 2.5 millimeters per minute (mm/min). Among the plurality of single-wall carbon nanotubes, there are strongly inherent van der Waals interactions. Consequently, the single-wall carbon nanotubes are substantially densely aligned and extend outwardly from the outer surface of the substrate 40, i.e., a single-wall carbon nanotube array is formed.

Figure 3:
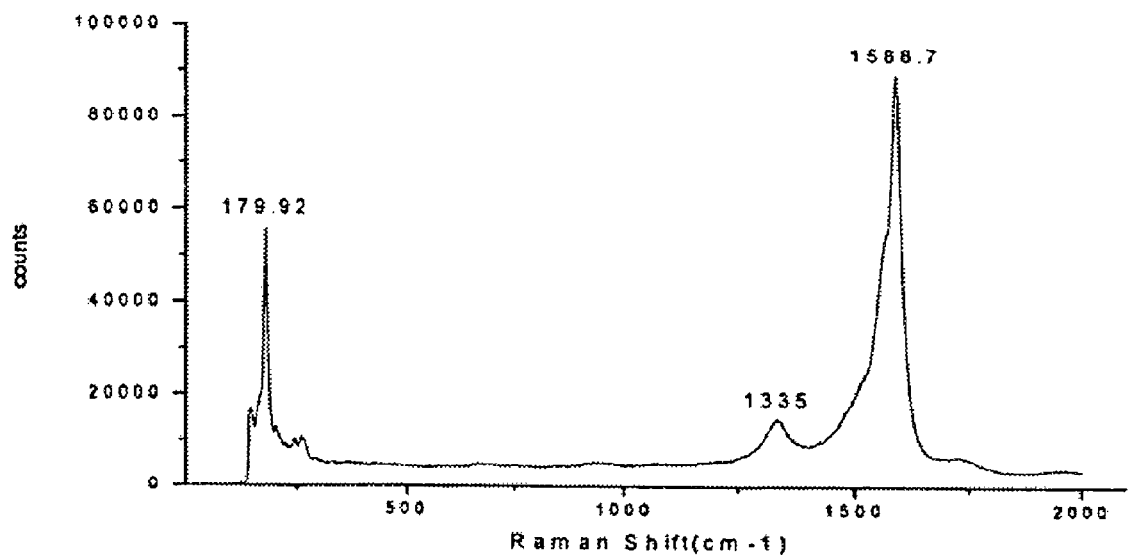
FIG. 3 shows a Raman spectra of a single-wall carbon nanotube array formed at 950° C., in accordance with one preferred embodiment.

A Raman spectra of the single-wall carbon nanotube array formed at 950° C., in accordance with the preferred method using the preferred apparatus, is shown in FIG. 3. Each peak corresponds to one diameter of the radial breathing mode and is inversely proportional to a diameter of the single-wall carbon nanotube. Further, it is recognized that the maximum count radial mode has a peak of 179.92 $cm^{-1}$, which indicates that the diameter of single-wall carbon nanotubes is 1.29 nm.

Figure 4:
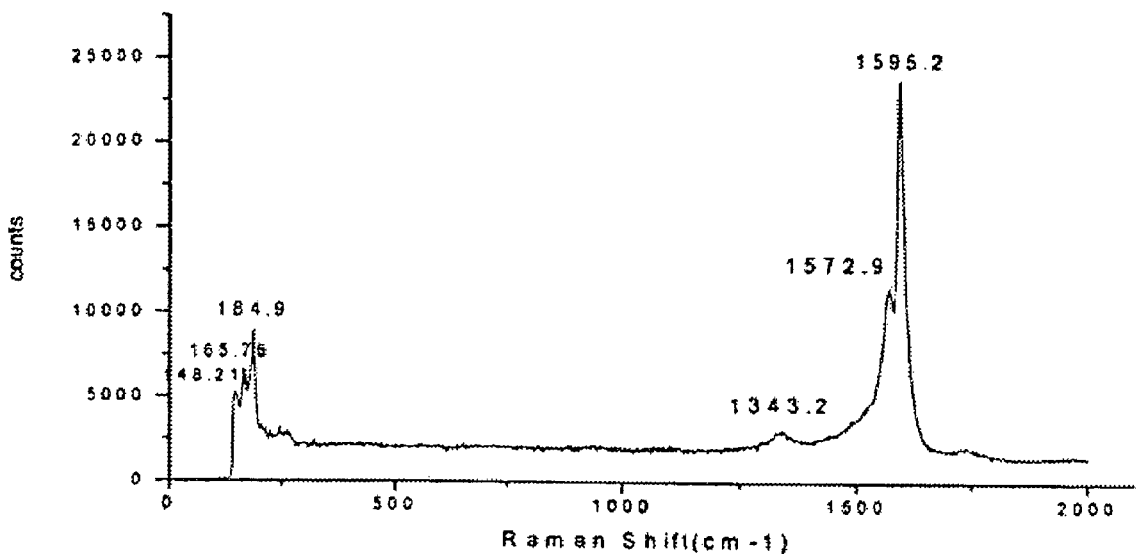
FIG. 4 shows a Raman spectra of a single-wall carbon nanotube array formed at 1000° C. in accordance with another preferred embodiment.

A Raman spectra of the single-wall carbon nanotube array formed at 1000° C., in accordance with the preferred method using the preferred apparatus, is shown in FIG. 4. In this instance, it is recognized that the primary diameters of radial breathing modes are 184.9 $cm^{-1}$, 165.76 $cm^{-1}$, and 148.21 $cm^{-1}$, which respectively indicate that the diameters of single-wall carbon nanotubes are 1.25 nm, 1.40 nm, or 1.58 nm. It is understood that a Raman spectrum of the SWNT has mainly two parts: (a) radial breathing mode (~100-300 $cm-1$); and (b) tangential mode (~1450-1650 $cm-1$). The Raman frequency of the radial breathing modes is directly related to the diameter of the SWNT, whereas the tangential mode provides the insight into the electronic properties of the SWNT. It is realized that there is also a weak intermediate frequency region ~300-1450 $cm-1$, which is related to the chirality of the SWNT.

As stated above, the local heating device 20, as configured, can advantageously provide an apparent temperature gradient at the catalyst location via selective heating of the catalyst 42. As such, a high nucleation rate of single-wall carbon nanotubes can be achieved. The gaseous carbon supplier 30 can introduce additional gaseous carbon into the reactor 10 to meet the requirement of an abundant supply of carbon atoms needed for a fast growth of single-wall carbon nanotubes. Accordingly, a plurality of substantially densely aligned single-wall carbon nanotubes, i.e., a single-wall carbon nanotube array, originating and extending outwardly from the outer surface of the substrate 40, having the catalyst 42 thereon, can be readily obtained.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for synthesizing a single-wall carbon nanotube array, comprising the steps of:

receiving a catalyst thin film formed on a surface of a substrate into a chemical vapor deposition reactor;

selectively heating the catalyst thin film up to a predetermined temperature;

vaporizing a graphite block to introduce gaseous carbon into the chemical vapor deposition reactor;

introducing a reactant gas containing a carbon source gas selected from the group consisting of methane, ethylene, acetylene, and mixtures thereof, into the chemical vapor deposition reactor, wherein the carbon source gas and the gaseous carbon reach the catalyst thin film to form the single-wall carbon nanotube array comprising a plurality of aligned single-wall carbon nanotubes originating and extending outwardly from the surface of the substrate, the carbon source gas and the gaseous carbon act as sources for carbon in the carbon nanotubes.

2. The method of claim 1, wherein the substrate is comprised of a material selected from the group consisting of silicon, glass, quartz, silicon oxide, and aluminum oxide.

3. The method of claim 1, wherein the selective heating of the catalyst thin film is performed in a manner that the heating is restricted to the catalyst thin film such that the reactant gas and the substrate are not heated until reaching the catalyst thin film, so as to achieve an apparent temperature gradient at the catalyst thin film location.

4. The method of claim 3, wherein the selective heating is implemented by using a local heating device positioned proximate the catalyst and configured for selectively and locally heating the catalyst thin film to the predetermined temperature.

5. The method of claim 4, wherein the local heating device is a microwave heating device comprising a microwave generator for generating microwaves and a microwave guide for guiding the microwaves to the catalyst thin film; a radio-frequency heating device comprising a radio-frequency generator disposed near the catalyst thin film for generating radio-frequency energy; or an electromagnetic inductive heating device comprising a high-frequency coil around the reaction zone and a high-frequency power supply for applying a high-frequency current to the high-frequency coil.

6. The method of claim 1, wherein the carbon source gas introduced into the chemical vapor deposition reactor reaches the catalyst thin film together with the gaseous carbon.

7. The method of claim 1, wherein the heating of the catalyst thin film converts the catalyst thin film into a plurality of densely packed nano-sized catalyst particles.

8. The method of claim 1, wherein strong inherent Van der Waals interactions are among the plurality of single-wall carbon nanotubes to make the single-wall carbon nanotubes aligned and extend outwardly from the outer surface of the substrate.

9. The method of claim 1, wherein the graphite block is evaporated by way of at least one process selected from the group consisting of a vaporization process, a laser vaporization process, and an arc discharge process.

10. The method of claim 1, wherein the predetermined temperature is in a range from 650 to 1200° C.

11. The method of claim 1, wherein the catalyst thin film is comprised of a material selected from the group of consisting of iron, cobalt, nickel, and alloys thereof.

12. The method of claim 1, wherein the gaseous carbon is in the form of single carbon atoms, a cluster of a plurality of carbon atoms, or a combination thereof.

13. The method of claim 1, wherein the graphite block is evaporated in a gaseous carbon supplier that is hermetically connected to the reactor.

14. The method of claim 1, wherein an average growth velocity of the single-wall carbon nanotubes is about 2.5 millimeters per minute.

15. A method for synthesizing a single-wall carbon nanotube array, comprising the steps of:
    receiving a catalyst thin film formed on a surface of a substrate into a chemical vapor deposition reactor;
    selectively heating the catalyst thin film up to a predetermined temperature;
    vaporizing a graphite block to introduce a gaseous carbon into the chemical vapor deposition reactor;
    introducing a reactant gas containing a hydrocarbon gas into the chemical vapor deposition reactor,
    wherein the carbon source gas and the gaseous carbon reach the catalyst thin film to form the single-wall carbon nanotube array comprising a plurality of aligned single-wall carbon nanotubes originating and extending outwardly from the surface of the substrate, the carbon source gas and the gaseous carbon act as sources for carbon in the carbon nanotubes.

* * * * *